United States Patent [19]
Ficalora et al.

[11] Patent Number: 5,386,432
[45] Date of Patent: Jan. 31, 1995

[54] RING LASER ANGULAR RATE SENSOR GETTER MOUNTING CLIP

[75] Inventors: Joseph P. Ficalora, Oak Ridge; John H. Moody, Riverdale, both of N.J.

[73] Assignee: AlliedSignal Inc., Morris Township, Morris County, N.J.

[21] Appl. No.: 218,195

[22] Filed: Mar. 28, 1994

[51] Int. Cl.6 ............................................. H01S 3/083
[52] U.S. Cl. ...................................... 372/94; 372/33; 372/34; 372/82; 372/65; 356/350; 313/549
[58] Field of Search ........................ 372/94, 33, 82, 65, 372/34; 356/350; 313/549

[56] References Cited
U.S. PATENT DOCUMENTS

| | | |
|---|---|---|
| 4,503,543 | 3/1985 | Ljung et al. ........................... 372/94 |
| 4,639,231 | 1/1987 | Koper et al. ........................... 372/94 |
| 4,740,985 | 4/1988 | Podgorski ............................. 372/94 |
| 5,056,102 | 10/1991 | Galbrecht ............................. 372/94 |

*Primary Examiner*—Leon Scott, Jr.
*Attorney, Agent, or Firm*—Howard G. Massung

[57] ABSTRACT

A ring laser angular rate sensor getter mounting clip is configured so that the susceptibility of the mounting clip to radio frequency (RF) energy used to activate the getter is minimized. The clip is configured so that opposing RF current flow is induced which prevents heating of the clip beyond force relieving temperatures for the clip material, whereby the clip maintains its retaining force within a getter well via three contact surfaces to more stably retain the getter in its proper position within the well.

11 Claims, 3 Drawing Sheets

RING LASER ANGULAR RATE SENSOR GETTER MOUNTING CLIP

BACKGROUND OF THE INVENTION

This invention relates generally to ring laser angular rate sensors and more particularly to a mounting clip for retaining a getter inside a ring laser angular rate sensor.

A getter consists of a pure metallic material which, in the preferred embodiment of the present invention, is barium. A getter mounting clip is disposed within a block of a ring laser angular rate sensor in communication with the optical cavity of the sensor. The purpose of the getter is to have its material combine with unwanted non-noble gas components desorbed from the interior of the angular rate sensor optical cavity during storage and operation of the sensor. The getter is necessary since evacuation and subsequent noble gas fill does not accomplish a lasting cleanliness of the lasing gas. In order to maintain a long life of the ring laser angular rate sensor, it is important that only noble gases remain in the optical cavity during operation of the sensor.

U.S. Pat. No. 4,670,691 (U.S. Cl. 313/549) which issued to Podgorski on Jun. 2, 1987 describes a typical getter for a ring laser angular rate sensor.

A getter oxidizes during handling. The getter needs to be activated by heating at a high temperature, which may typically be 900° C. for several minutes. This heating which occurs in a vacuum causes impurities on the surface of each grain in the getter to diffuse towards the getter interior. The getter surface is thereby cleaned and the getter is re-activated to absorb contaminating gas molecules, which it can do at room temperature. The getter is usually activated via a radio frequency (RF) arrangement. The RF activation affects the getter mounting clip as by heating the clip. This causes the mounting clip to lose its getter retaining characteristics which may cause the getter to be damaged by external vibrations or the like.

U.S. Pat. No. 4,503,543 which issued to Ljung, et al on Mar. 5, 1985 (U.S. Class 372/94) relates to a getter retainer or mounting clip having a resilient serpentine shaped tungsten wire formed to match a short wire section to hold a getter. The getter holder assembly so formed is positioned within a stepped oblong bore so that the getter is in firm contact with the bore surface at two points. This prevents resonances of the getter or getter mounting clip that might otherwise destroy the getter when subjected to vibrations. This particular device has the disadvantage of being difficult to manufacture and assemble.

U.S. Pat. No. 4,639,231 issued to Koper, et al on Jan. 27, 1987 (U.S. CLass 445/31) relates to a getter retainer or mounting clip wherein a groove is formed in a plate which is hermetically sealed to a hole in a ring laser angular rate sensor block. The cylindrically shaped getter is placed longitudinally in the groove such that the getter contacts the groove along only two lines. A mousetrap shaped spring preloads the getter against the groove so as to prevent acceleration forces and vibrations from causing pieces of the getter, heater coil or wire to break loose.

Neither of these devices appear to address the situation, as does the present invention, wherein the getter mounting clip is rendered less susceptible to RF activation of the getter.

SUMMARY OF THE INVENTION

This invention contemplates a ring laser angular rate sensor getter mounting clip which is configured such that opposing RF currents are induced whereby an eddy current effect inhibits heating of the clip beyond force relieving temperatures for the material used for the clip.

For the purposes aforenoted, the mounting clip of the invention is configured as a unitary member having a pair of generally S-shaped sides disposed in opposing spaced relation. Corresponding inwardly curved ends of the S-shaped sides are formed as a continuous section of the mounting clip to provide a first contact surface. The opposite corresponding outwardly curved ends of the S-shaped sides provide second and third contact surfaces, respectively. The first, second and third contact surfaces contact the walls of a getter well for insuring that the getter mounting clip is stably mounted within said well via a retaining force between the contact surfaces and the walls of the well. The getter has tabs which are affixed to the mounting clip.

DETAILED DESCRIPTION OF THE INVENTION

Figure 1:
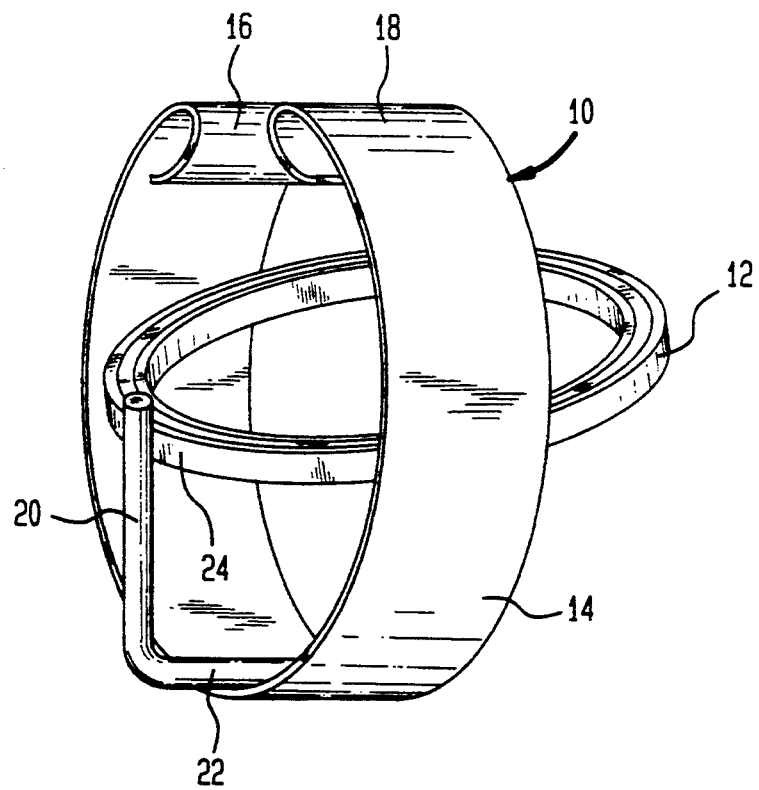
FIG. 1 is a diagrammatic representation illustrating a getter and getter mounting clip in accordance with one form of the prior art.

With reference first to FIG. 1, a getter mounting clip is designated by the numeral 10. Mounting clip 10 supports a ring laser angular rate sensor (gyroscope) getter 12. Getter 12 is fabricated from a suitable metallic material such as, for example, barium. Mounting clip 10 includes a strip of a material such as a suitable stainless steel which is formed in a generally C-shaped configuration. The body of clip 14 has turned down ends 16 and 18 and a perpendicularly shaped wire 20 secured as by welding at an end 24 to getter 12 and at 22 to the body of clip 14. The axis of the clip is generally perpendicular to the axis of the getter.

Getter 12 is positioned within a glass body of a ring laser angular rate sensor. Typically, the angular rate sensor oscillates about an input axis and lasing gases generate monochromatic light along an optical path including straight optical cavity sections interconnected by a large corner recess. Getter 12 is disposed within a well or bore formed within the body of the angular rate sensor within the vicinity of the recess and exerts a retaining force against the well. The axis of generally circular shaped getter 12 is parallel to the input axis of the angular rate sensor.

During fabrication of a ring laser angular rate sensor, the optical cavity is evacuated. However, since it is impossible to maintain a perfect vacuum, gases will be desorbed from the walls in the optical cavity to contaminate the lasing gas. The contaminated lasing gas will lose its ability to provide gain in the optical cavity and therefore adversely affects the useful life of the angular rate sensor.

Accordingly, when the cavity of the angular rate sensor is fully evacuated, getter 12 is heated to incandescence at a typical temperature of 900° C. This temperature is held for a typical period of 1–2 minutes and the sensor is then backfilled with noble gas and sealed off.

In order to energize the getter to incandescence as aforenoted, an RF coil is excited with a typical frequency of 0.5–30.0 MHz at a power level of approximately 5 kw. The getter surface is quite pure for continued combination with extraneous non-noble gas molecules which may leak into or get desorbed from the walls of the optical cavity in small quantities at room temperature.

Only as much of the structure and operation of an angular rate sensor getter and mounting clip as is necessary to understand the present invention has been herein described. This structure and operation is more fully described in the aforementioned U.S. Pat. No. 4,503,543, said description being incorporated herein by reference.

With the getter/mounting clip assembly as illustrated in FIG. 1 positioned within the angular rate sensor as aforenoted, several problems will occur during operation of the sensor. Primarily, mounting clip 10 absorbs some of the RF energy from an RF coil which energizes getter 12 and the getter becomes hot. Due to the generally C-shaped configuration of the mounting clip, stresses develop in the clip. It has been noted that, at times, the stresses are high enough to reduce the retaining force between the mounting clip and the walls of the angular rate sensor well. This results in movement of the getter within the well when the angular rate sensor is subjected to vibrations. This is, of course, an unacceptable situation.

Figure 2:
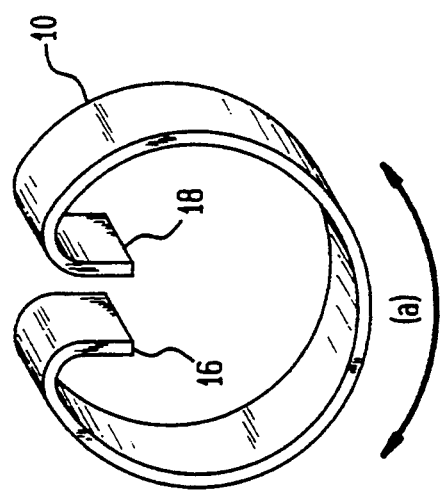
FIG. 2 is a diagrammatic representation illustrating a prior art getter mounting clip, and further illustrating induced RF current flow around the clip upon the getter being activated.

This situation is illustrated with reference to FIG. 2. The configuration of mounting clip 10 is such that only a single surface for RF current flow is provided, with the current flow designated by arrow (a) in the Figure. This situation is alleviated by forming a mounting clip as best illustrated in FIG. 3.

Figure 3:
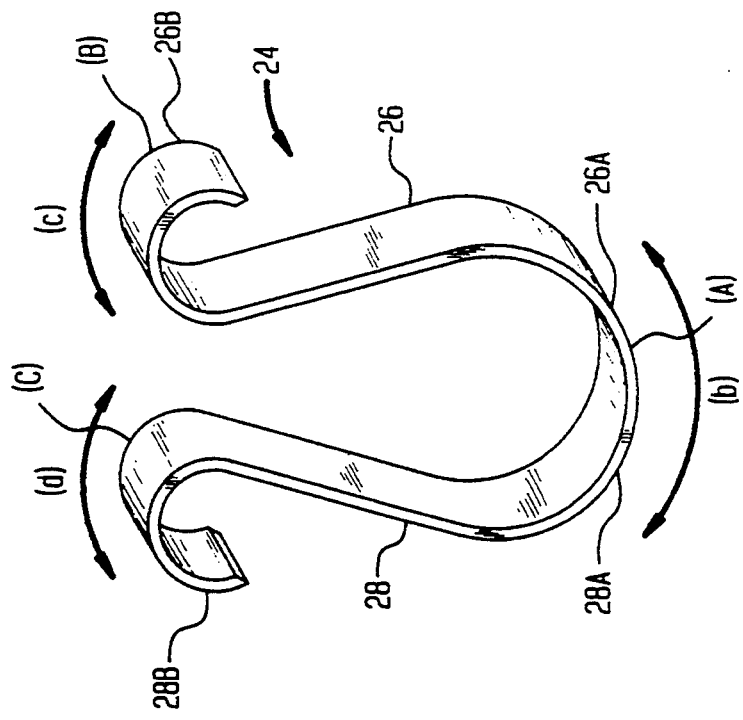
FIG. 3 is a diagrammatic representation of a mounting clip according to the present invention, and further illustrating RF current flow around the mounting clip upon the getter being activated.

Thus, and with reference to FIG. 3, the mounting clip of the invention is designated generally by the numeral 24 and includes a pair of generally S-shaped sides 26 and 28. Sides 26 and 28 are disposed in opposing spaced relation. Corresponding inwardly curved ends 26A and 28A of sides 26 and 28, respectively, are formed as a continuous section of mounting clip 24 to provide a first contact surface (A) substantially centrally disposed on the continuous surface. The opposite outwardly curved ends 26B and 28B of sides 26 and 28, respectively, provide second and third contact surfaces (B) and (C), respectively. The first, second and third contact surfaces (A), (B) and (C) contact a getter well and exert a retaining force against the well for insuring that the getter mounting clip is stably mounted within said well, as will hereinafter become evident with reference to FIG. 4.

Figure 4:
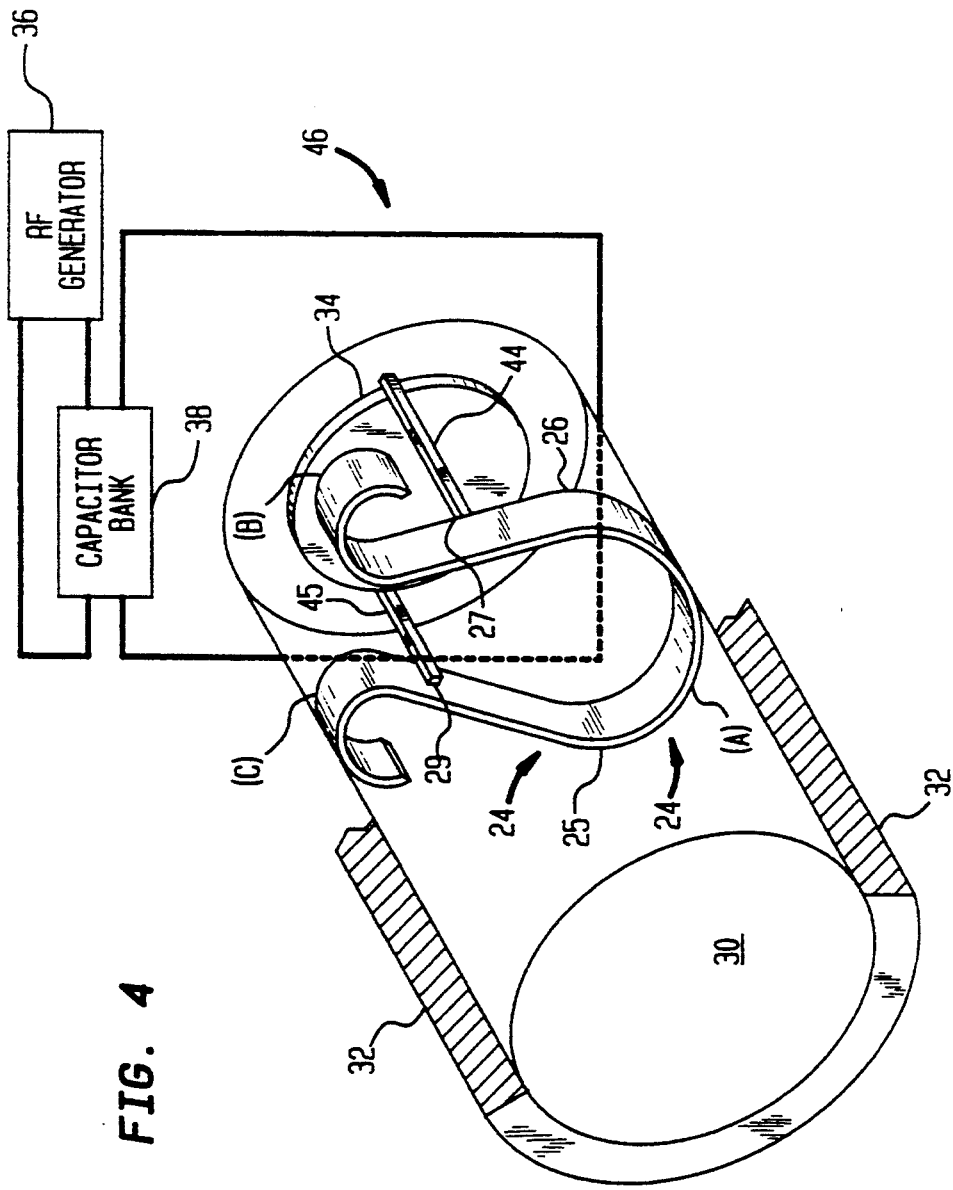
FIG. 4 is a diagrammatic representation illustrating the getter/getter mounting clip arrangement of the present invention.

With reference now to FIG. 4, mounting clip 24, configured as described with reference to FIG. 3 is disposed within a well 30 formed within the body of a ring laser angular rate sensor 32. A getter 34 is located within well 30 within the vicinity of a recess as described in the aforementioned U.S. Pat. No. 4,503,543.

Mounting clip 24, which is preferably of a high temperature alloy such as Inconell 718, receives less RF energy from an RF generator 36 which activates getter 34 so that the mounting clip retains its contact within bore 30 at the three contact surfaces (A), (B) and (C).

In this regard, RF generator 36 is connected to a closed inductor loop 46 including a capacitor bank 38 whereby a single loop inductor circuit is provided for induction heating of getter 34. The RF coupling to getter 34 is strongest at the center of the single loop inductor circuit. There is a smaller amount of RF coupling to mounting clip 24.

Getter 34 is secured to mounting clip 24 via a pair of elongated getter tabs 44 and 45 extending from opposite sides of the getter to the mounting clip, and which tabs 44 and 45 are affixed to corresponding sides 26 and 28 of mounting clip 24 as by spot welding or the like at points 27 and 29 between the inwardly and outwardly curved ends of said sides.

With reference again to FIGS. 2 and 3, the RF current generated by RF generator 36 through closed inductor loop 46 flows around a single surface of substantially circular mounting clip 10 as indicated by arrow (a), as aforenoted. With the mounting clip of the present invention configured as indicated, RF current flows around a primary mounting clip surface formed by curved ends 26A and 28A of sides 26 and 28 in a continuous configuration, and which current flow is designated by the arrow (b). RF current flows around secondary mounting clip surfaces formed by clip ends 26B and 28B as designated by the arrows (c) and (d). These secondary current flow surfaces permit current flow in opposition to the current flow about the primary current flow surface.

Thus, an eddy current effect is provided which minimizes the current flow around mounting clip 24 due to RF heating or activation of getter 34 (FIG. 4). That is to say, mounting clip 24 is coupled to the RF energy used to activate getter 34 so that heating of mounting clip 24 beyond the temperature for relieving the retaining force of the mounting clip against angular rate sensor well 30 is inhibited. This insures that getter 34 will be supported in its firing position within well 30. Due to the shape of the mounting clip, the clip is coupled to significantly less RF energy than would otherwise be the case, as will be recognized as desireable for proper functioning of the mounting clip.

There has thus been described a ring laser angular rate sensor getter mounting clip which is configured such that opposing RF currents are induced upon activation of the getter, whereby an eddy current effect prevents heating of the clip beyond force relieving temperatures for the material used for the clip. The clip as described is simple to manufacture and avoids significant problems encountered by prior art getter mounting clips, whereby the forces holding the clip within the angular rate sensor well have been relieved upon the getter being activated, resulting in a less stable retention of the getter in a proper firing position than that provided by the present invention.

With the above description of the invention in mind, reference is made to the claims appended hereto for a definition of the scope of the invention.

What is claimed is:

1. In a ring laser angular rate sensor, a getter mounting clip, comprising:

a pair of substantially S-shaped sides disposed in opposing spaced relation, said sides having corresponding inwardly curved ends and opposite corresponding outwardly curved ends;

the corresponding inwardly curved ends formed as a continuous section of the mounting clip for providing a first contact surface;

the corresponding outwardly curved ends providing second and third contact surfaces;

the mounting clip disposed within a ring laser angular rate sensor well, with the first, second and third contact surfaces exerting a retaining force against the well;

a getter affixed to the mounting clip; and the configuration of the mounting clip being effective for inducing opposing RF currents when the getter is activated by an RF source, whereby heating of said mounting clip beyond retaining force relieving temperatures is inhibited.

2. The getter mounting clip as described by claim 1, including:

a first mounting point between the inwardly and outwardly curved ends of one of the pair of substantially S-shaped sides;

a second mounting point between the inwardly and outwardly curved ends of the other of the substantially S-shaped sides; and the getter being affixed to the mounting clip at the first and second mounting points.

3. The getter mounting clip as described by claim 1, wherein:

the continuous section of the mounting clip providing a first RF current flow surface;

the corresponding outwardly curved ends of the pair of substantially S-shaped sides providing second and third RF current flow surfaces; and RF current flow around the second and third RF current flow surfaces opposing RF current flow around the first current flow surface, whereby coupling of the mounting clip to the RF current is minimized to inhibit heating of said clip beyond the retaining force relieving temperatures.

4. In a ring laser angular rate sensor having a getter heated by an RF current source, and the getter is mounted within a well by a getter mounting clip, said mounting clip comprising:

a first RF current flow surface;

second and third RF current flow surfaces; and

RF current flow around the second and third RF current flow surfaces opposing RF current flow around the first current flow surface, whereby coupling of the mounting clip to the RF current is minimized to inhibit heating of said clip beyond temperatures which relieve forces which retain the getter mounting clip within the well.

5. The getter mounting clip as described by claim 4, including:

a first side having an inwardly curved end and an outwardly curved end;

a second side having a corresponding inwardly curved end and a corresponding outwardly curved end;

the corresponding inwardly curved ends formed as a continuous section, said section being the first RF current flow surface; and the corresponding outwardly curved ends being the second and third RF current flow surfaces.

6. The getter mounting clip as described by claim 5, wherein:

the first and second sides are substantially S-shaped and are disposed in opposing spaced relation.

7. The getter mounting clip as described by claim 6, including:

a first mounting point between the inwardly and outwardly curved ends of the first side;

a second mounting point between the inwardly and outwardly curved ends of the second side; and the getter affixed to the first and second mounting points.

8. The getter mounting clip as described by claim 5, including:

a first mounting point between the inwardly and outwardly curved ends of the first side;

a second mounting point between the inwardly and outwardly curved ends of the second side; and the getter affixed to the first and second mounting points.

9. A method for mounting an RF fired getter in the well of an angular rate sensor, comprising:

forming a mounting clip as having a pair of substantially S-shaped sides in opposing spaced relation, with said sides having corresponding inwardly curved ends and corresponding outwardly curved ends;

providing a first contact surface by forming said corresponding inwardly shaped ends as a continuous section;

using said outwardly shaped ends as second and third contact surfaces;

affixing the getter to the mounting clip; and disposing the getter and the mounting clip affixed thereto in the well so that said first, second and third contact surfaces exert a retaining force on said well.

10. A method as described by claim 9, including:

inhibiting RF coupling to the mounting clip by inducing RF current flow around the continuous section in one direction, and around the corresponding outwardly shaped ends in an opposite direction, thereby inhibiting heating of said mounting clip beyond retaining force relieving temperatures.

11. In a ring laser angular rate sensor, a getter mounting clip, comprising:

a pair of substantially S-shaped sides disposed in opposing spaced relation, said sides having corresponding inwardly curved ends and opposite corresponding outwardly curved ends;

the corresponding inwardly curved ends formed as a continuous section of the mounting clip for providing a first contact surface;

the corresponding outwardly curved ends providing second and third contact surfaces;

affixing the mounting clip to a getter;

the mounting clip and the getter affixed thereto disposed within a ring laser angular rate sensor well, with the first, second and third contact surfaces exerting a retaining force against the well.

* * * * *